United States Patent [19]

Hürlimann

[11] Patent Number: 5,020,323
[45] Date of Patent: Jun. 4, 1991

[54] TELESCOPICALLY EXTENDABLE AND RETRACTABLE ARM

[76] Inventor: Peter Hürlimann, Minervastrasse 46, 8032 Zürich, Switzerland

[21] Appl. No.: 415,585

[22] Filed: Sep. 29, 1989

[30] Foreign Application Priority Data

Oct. 3, 1988 [CH] Switzerland ..................... 3670/88

[51] Int. Cl.[5] .......................................... F16D 31/02
[52] U.S. Cl. ..................................... 60/413; 212/184; 414/718; 414/728; 901/21
[58] Field of Search .................... 60/413; 212/184; 901/21; 414/718, 728, 749, 751

[56] References Cited

U.S. PATENT DOCUMENTS

| | | | |
|---|---|---|---|
| 3,777,629 | 12/1973 | Johnston et al. | 414/718 |
| 4,268,228 | 5/1981 | McKee | 60/413 |
| 4,417,845 | 11/1983 | Burton | 414/718 |
| 4,507,044 | 3/1985 | Hutchins et al. | 901/21 |
| 4,547,119 | 10/1985 | Chance et al. | 414/718 |
| 4,598,598 | 7/1986 | Kring et al. | 901/21 |

Primary Examiner—Ronald C. Capossela
Attorney, Agent, or Firm—Barnes & Thornburg

[57] ABSTRACT

The arm includes a supporting member and a plurality of telescoping members located therein and having a subsequently decreasing diameter. The supporting member and the telescoping members are interconnected by means of at least one kinematic train which is formed by endlessly guided pulling members. These pulling members, preferably steel belts, interconnect three respective adjoining telescoping members. The belts are mounted to the respective outer two telescoping members and guided for return at the upper and bottom area of the center member. When displacing the telescoping member having the largest diameter relative to the supporting member any further telescoping member is displaced relative to its outer adjoining member by a corresponding distance. This design leads to a rigid smoothly operating telescoping arm having a small structural height.

16 Claims, 4 Drawing Sheets

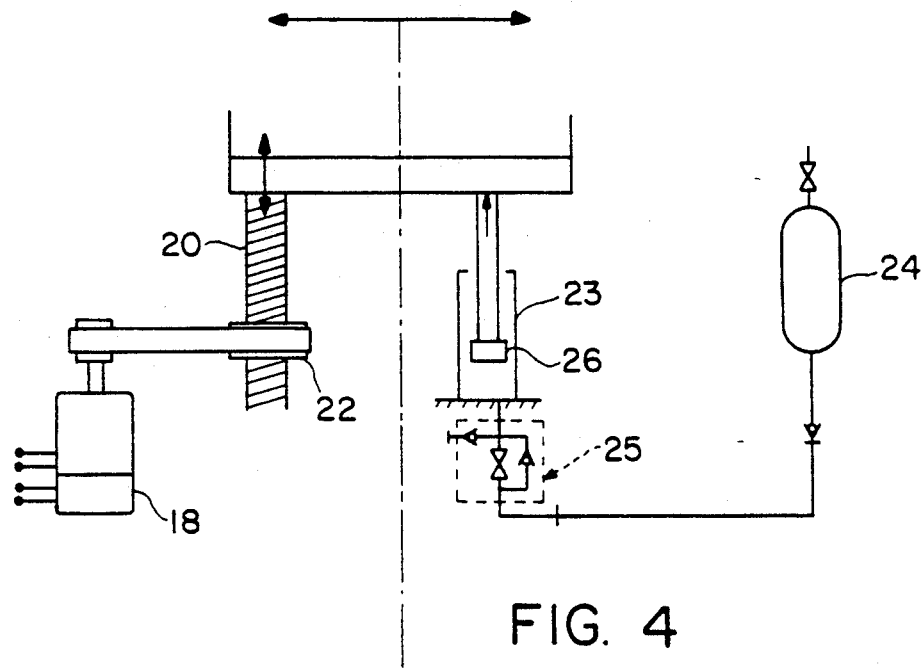
FIG. 4
FIG. 5
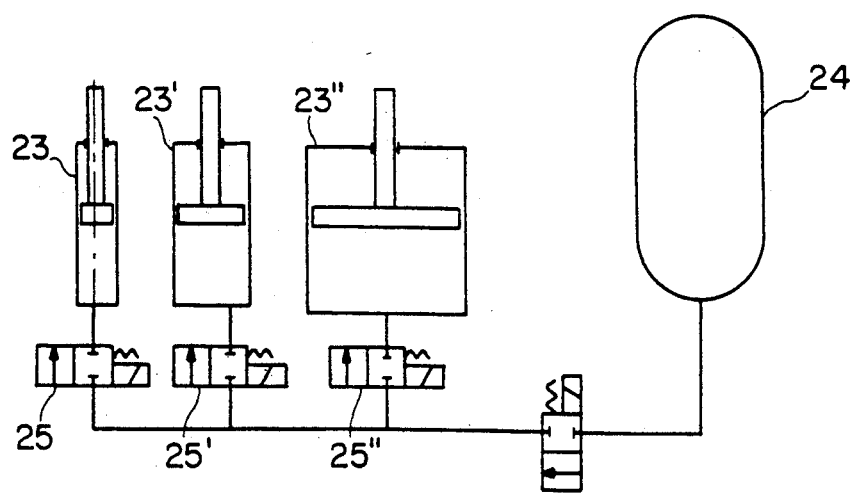

TELESCOPICALLY EXTENDABLE AND RETRACTABLE ARM

BACKGROUND OF THE INVENTION

1. Field of the Invention

The present invention relates to a telescopically extendable and retractable arm including a supporting member and a plurality of telescoping members of decreasing diameter located in the supporting members.

2. Description of the Prior Art

Telescopically extendable and retractable arms of the kind referred to find a plurality of technical applications such as e.g. extendable stands or telescoping pillars or also as supporting members or arms, respectively, for industrial robots and similar apparatuses.

These structures give, however, rise to difficulties in that a plurality of features are demanded which actually hinder each other, namely a large supporting power in both directions in the longitudinal direction of the arm, a smooth and reproducible extending and retracting, an absorbing of eccentrically acting loads, a large length of stroke but simultaneously a small structural height in the retracted position, low proper weight, high stiffness or rigidity, respectively, as well as in some specific applications such as tripods for cameras, a noiseless operation.

Generally available conventional telescoping arms meet above demands in part only.

SUMMARY OF THE INVENTION

A general object of the invention is to provide a telescopically extendable and retractable arm which meets all demands set forth above.

A further object of the present invention is to provide a telescopically extendable and retractable arm which includes at least one kinematic train formed of returning pulling members interconnecting the supporting member and the telescoping members, whereby in every train proceeding from the supporting member any respective three subsequent members are interconnected by pulling members which are mounted to the respective two outer members and are guided above and below around the respective center member such that upon a dislocating of the telescoping member having the largest diameter relative to the supporting member every further telescoping member is dislocated by a corresponding distance relative to its outer adjoining member by the kinematic train.

Yet a further object of the invention is to provide a telescopically extendable and retractable arm having a system of endless pulling members which allow a smooth extending and retracting of such arm when subjected to forces acting in both longitudinal directions thereof as well as when absorbing eccentrically acting loads.

Still a further object is to provide an arm in which the pretension of its pulling members or belts, respectively, is adjustable such that a reproducible extending and retracting without any play between members is arrived at.

A further object is to provide a telescopically extendable and retractable arm structured as linearly extendable and retractable telescopic tube which includes a linear guide operating between its supporting element and the telescoping member having the largest diameter or then between two arbitrary adjoining telescoping members. It is not necessary to provide more guiding means between the individual telescoping members because their mutual position is set by the belt system.

Still a further object is to provide a telescopically extendable and retractable arm which may be controlled into a configuration extending along a curvilinear line.

Still a further object is to provide a telescopically extendable and retractable arm in which the telescoping member having the largest diameter may be controlled by means of suitable drives into an angular position relative to the supporting member. Such angular position is, according to a further object of the invention, transmittable via the pulling member system onto all telescoping members which are also controllable into an angular position relative to each other. This allows to provide a universally movable arm such as an arm of an industrial robot which may make linear as well as pivoting movements.

BRIEF DESCRIPTION OF THE DRAWINGS

The present invention will be more fully understood and objects other than mentioned above will become apparent when reference is made to the following detailed description thereof when read in conjunction with the attached drawings, wherein:

FIG. 4 is a schematic view of a first means for balancing the load for an arm; and FIG. 5 is a diagram illustrating a modified means for balancing the load for the arm.

DESCRIPTION OF THE PREFERRED EMBODIMENTS

Figure 1:
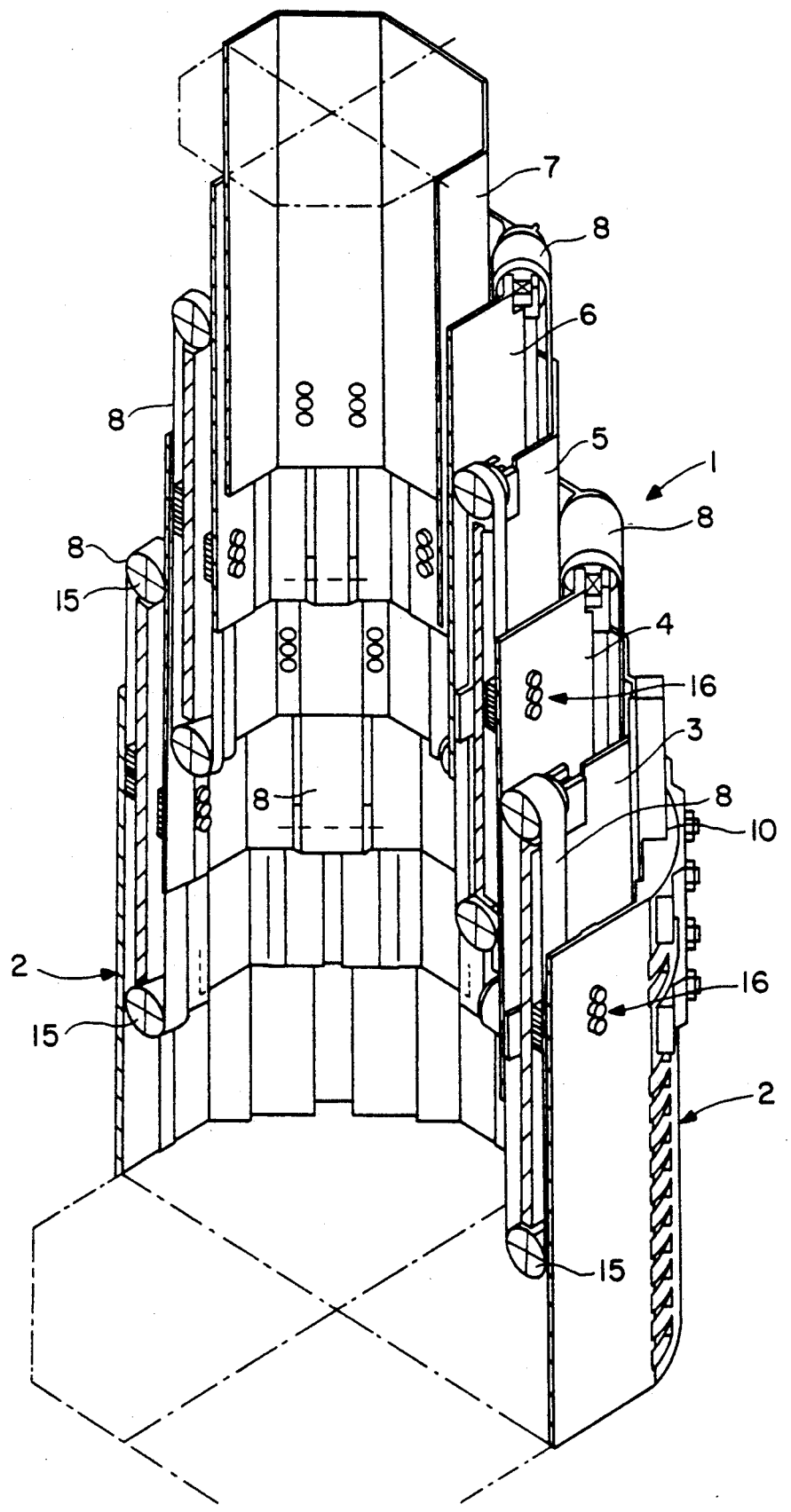
FIG. 1 illustrates a perspective view of an arm without its drive and illustrated in a section taken along its longitudinal axis.
Figure 2:
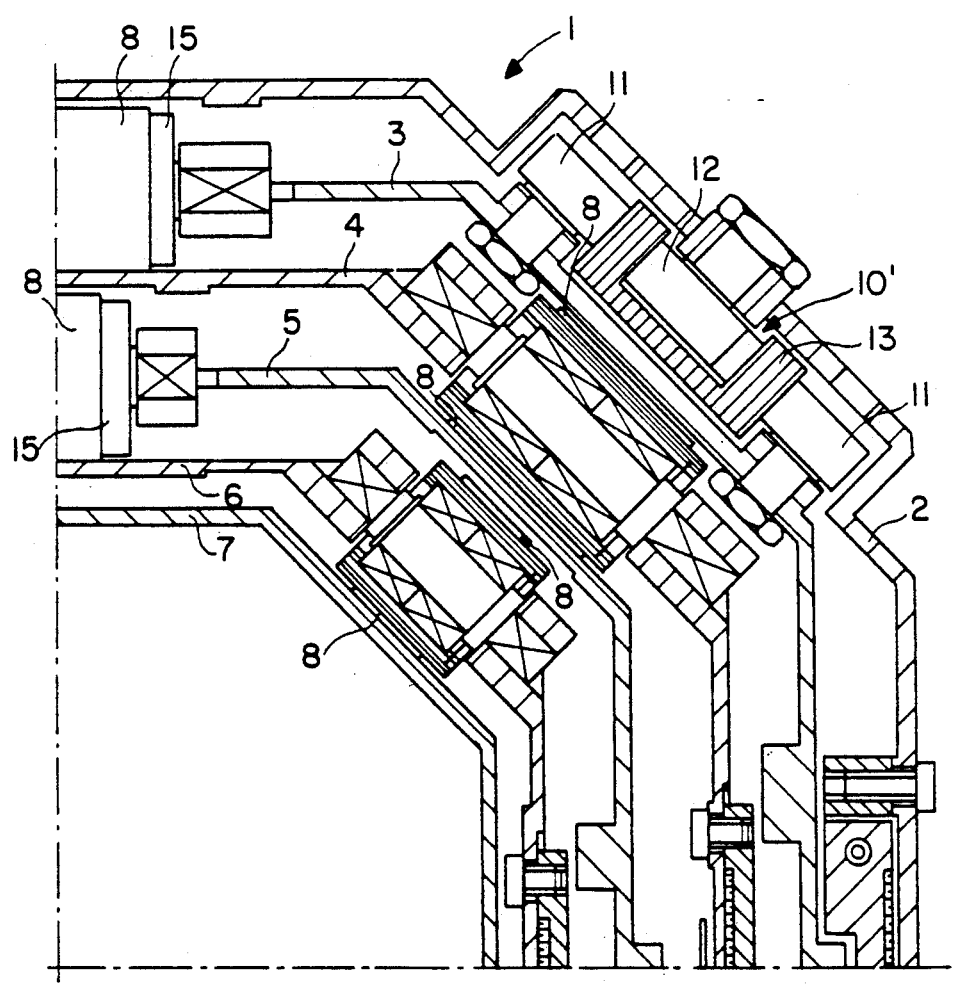
FIG. 2 is a sectional view of a 90° cutout of the arm of FIG. 1 having a somewhat modified longitudinal guiding system.

FIGS. 1 and 2 illustrate the basic structure of the kinematic trains between the telescoping members, which trains secure the transmitting of forces as well as of movements between the individual members. The telescopic arm 1 illustrated herein includes a supporting member 2 as well as five telescoping members 3–7 having a respective decreasing diameter. Quite obviously the number of telescoping members is not basically restricted to five.

The telescoping members 3–7 and the supporting member 2 of this particular illustrated embodiment are designed as profiled tubes having an octagonal crosssectional shape. The profiled tubes are made preferably of aluminium or a reinforced plastic material. Belts 8 extend along the planar sides of this profiled tubes, which belts 8 act as pulling members which interconnect the telescoping members. Each belt 8 is arranged such that it extends around one telescoping member, e.g. the telescoping member 5, and is mounted to the respective adjoining telescoping members, here the telescoping members 4 and 6. The mounting area at the outer telescoping member is located in the respective upper area thereof and the mounting area at the inner telescoping member is located at its bottom area. The kinematic train is now composed of a system of such endless circulating belts which interconnect in accordance with above mentioned arrangement always three immediately adjoining telescoping members along the entire telescopically extendable and retractable arm. Such a kinematic train is provided e.g. by the staggered belts 8 illustrated at the right hand side of FIG. 1.

The telescoping members are interconnected along such a kinematic train such that upon a dislocating of the telescoping member 3 having the largest diameter each of the telescoping members 4 to 7 is dislocated positively relative to the next outer adjoining member by the same distance.

The belts 8 of the illustrated embodiment of two immediately adjoining sides of the telescoping members form such a respective kinematic train. In case of the present exemplary eight sides of the profiled tube totally four kinematic trains are conclusively provided which are distributed along the circumference of the tube. It shall be noted distinctly, however, that already a smaller number, e.g. three, of such kinematic trains forms a stable system.

If now the arm must be linearly extendable and retractable such as illustrated in this particular embodiment it is sufficient to provide a longitudinal guide between two members of a give arm, whereby the guiding or supporting, respectively, of the balance of the members, of the other members is arrived at exclusively by the belt system such that merely a radial supporting is necessary between those members. FIGS. 1 and 2 disclose that the longitudinal guide 10 (FIG. 1) or 10' (FIG. 2), respectively, is located between the supporting member 2 and the telescoping member 3. Such longitudinal guides 10 and 10' are structured according to commonly known techniques and include rollers 11 and 12, which rest onto a longitudinal profiled member 13 such as illustrated in FIG. 2. Longitudinal guides of such design are located at every second side of the cross section of the profile. The linear movement between the telescoping member 3 of the largest diameter and the supporting member 2 which is linearly guided by mentioned longitudinal guides 10 and 10', respectively, is transmitted by the belt system such as mentioned above positively onto all following telescoping members.

The longitudinal guiding can be provided also by a drive between the supporting member 2 and the telescoping member 3 of the largest diameter, which drive acts as guide by being designed e.g. in form of three synchronously driven spindle drives which dislocate mentioned telescoping element 3 precisely linearly relative to the supporting member 2. In order to provide the telescopic arm 1 in any extended position with a as large as possible rigidity the belts 8 are of a stiff but bendable design. To this end steel belts are preferably used which are composed of a plurality of layers connected merely at their ends. The belts 8 are composed e.g. of six layers of spring steel each having a thickness of 0.1 mm. Accordingly endlessly extending belts 8 are provided which are rigid relative to their longitudinal direction but can be guided around rollers 15 having a relatively small diameter of e.g. 30 mm, by means of which belts 8 the telescoping members 3 to 7 are mutually interconnected. Specifically in the area of the returning points, i.e. the rollers, the individual layers of the belts 8 move relatively to each other when extending and retracting the arm 1, which adds to an attenuating of the transmission of oscillations between the individual telescoping members. In cases a low friction is desired during the extending and the retracting a Teflon coating may be present onto the individual steel layers, which coating reduces the friction at the points where the belts return.

A further measure to arrive at a high stiffness of the arm 1 and at a minimum of play thereof is to subject the endless belts 8 to a pretensioning. To this end each belt 8 is severed at least at its mounting area 16, in which area it is mounted to the respective outer telescoping member, whereby the individual ends are held in the mounting structure 16 for a movement relative to each other. The mounting structure 16 is accessible from the outside when the arm 1 is in its extended position (see FIG. 1), which allows the mounting of the belts 8 and the adjusting of their pretension.

According to the illustration of FIGS. 1 and 2 the belts 8 of a kinematic chain are located alternating staggered relative to each other. Therefore and due to the relatively small diameter of the guide rollers 15 the lateral distance between the telescoping members 2 to 7 or the decrease of their respective diameters, respectively, may be held relatively small which again increases the stiffness of the arm and allows furthermore to obtain in the inner space of the arm a sufficient space for a drive for the extending and retracting of the arm 1.

Figure 3:
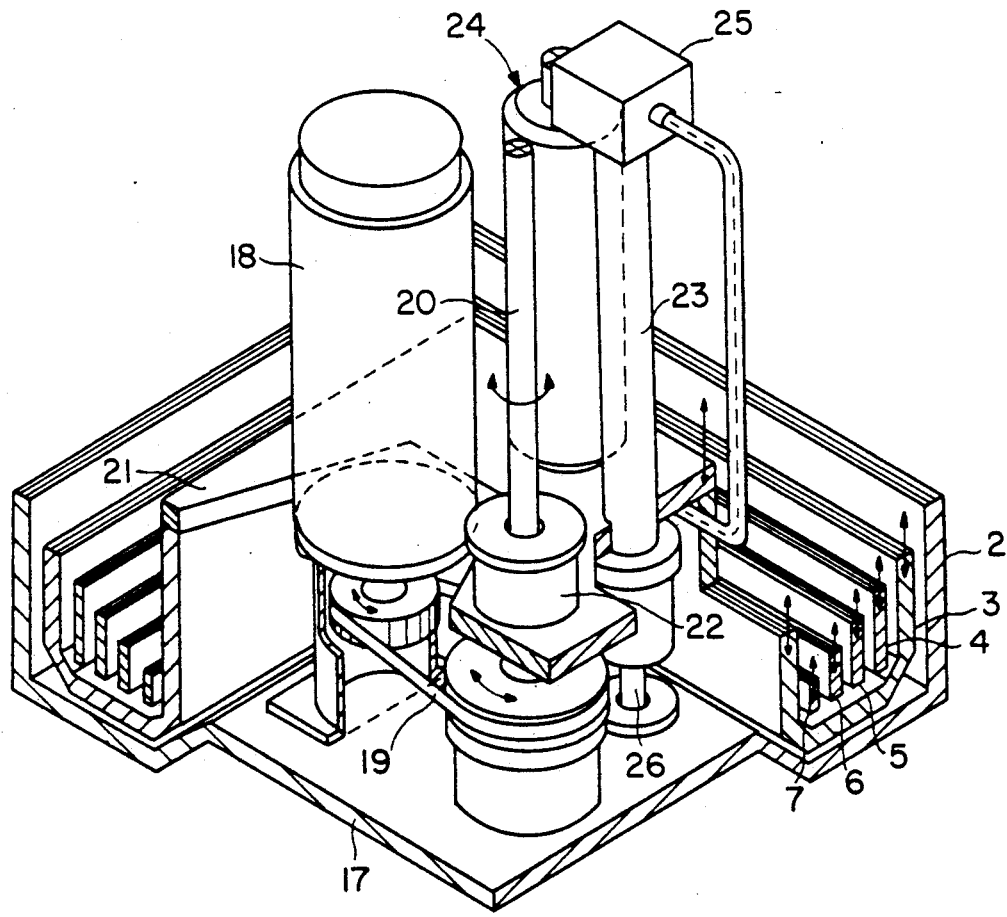
FIG. 3 is a perspective view of the driving portion located inside of the arm, which view illustrates the telescoping elements in a partly cut open way.

Such a drive used for the present embodiment is illustrated in detail in FIGS. 3 and 4. FIG. 3 illustrates specifically the lower ends of the supporting member 2 and of the retracted telescoping members 3-7. The supporting member 2 forms a bottom floor 17, onto which the driving units are mounted, namely an electric motor 18 which drives via a belt 19 a centrally located spindle 20. The telescoping member 3 having the largest diameter is now designed such that it extends under all other telescoping members 4 to 7 towards the inside and is mounted at that area to a supporting plate 21. A spindle nut 22 is mounted to this supporting plate 21, which nut 22 runs on the spindle 20. By this spindle drive the supporting plate 21 and accordingly the telescoping member 3 having the largest diameter are moved towards the supporting member 2 such that the other telescoping members 4 to 7, i.e. the balance of the telescoping members, are also displaced in accordance with the earlier mentioned procedure by the belts 8.

If the arm 1 is designed as a load supporting and load lifting column or pillar, respectively, a load balancing device can also be provided within such pillar, by means of which a portion of the load acting onto the arm is absorbed. Accordingly, the drive must absorb a reduced loading only such that it could be designed smaller. Furthermore, it is possible to regain a part of the lifting energy during the lowering movement. A hydropneumatic load balancing structure is illustrated in FIGS. 3 and 4, which absorbs at any extended position of the arm or pillar 1, respectively, a substantially constant load. To this end a hydraulic cylinder 23 is arranged on the supporting plate 21, and a piston 2 extends into the cylinder from below, which piston is supported against the bottom floor 17 (see FIG. 3; FIG. 4 is a schematic illustration only). The cylinder 23 is interconnected via valves 25 to a hydropneumatic pressure reservoir 24 which is also located on the supporting plate 21. A so-called gas-oil-bubble pressure reservoir may be used as pressure reservoir 24. Such allows to maintain at a small storage volume a relatively high pressure of 200–350 bar.

In order to adjust such load balancing to changing loads an embodiment includes such as illustrated in FIG. 5 a plurality of cylinders 23, 23', 23'' having various diameters and interconnected via valves 25, 25', 25" to a pressure reservoir 24 allowing a connecting thereto or a disconnecting therefrom. By a selective interconnecting of the three cylinders having cross sections in a preferred relation of 1:2:4 it is possible to achieve seven various load balancing values such to allow an adjusting to respective loads. A corresponding controlling may proceed via a load measuring cell (not illustrated) in an automatic manner. Accordingly, only one pressure reservoir 29 is needed for the three cylinders.

Due to the fact, that the drive is located within the retracted arm of the described inventive embodiment of the telescoping arm 1 it allows a low structural height. Because the belt system as described allows an extending of the telescoping members 3 to 7 over almost their entire longitudinal extent, a large lifting stroke or large range of adjustment, respectively, is arrived at. Additionally, the belt system allows a noiseless, smooth continuous displacing of the telescoping members in a nonvibrating manner. There are basically no restrictions regarding the speed of the extending and of the retracting. The belt system can be designed nonelastically and without any play which leads to a high stiffness of the arm, yet at the same token to a relatively light and compact design or structure, respectively. By means of the load balancing system which may also be located inside of the arm the expenditure on energy can be reduced and the dimensions of the drive chosen smaller. The described design allows not only a designing of the arm for linear displacing movements but also, by a suitable design of the drive such as, for instance, three independent spindle drives between supporting member 2 and telescoping member 3 of the largest diameter as a universally movable arm, i.e. an arm which can be extended linearly but also which may be pivoted into all directions. This embodiment provides an arm which is specifically suitable for robots where the linear embodiment is suitable, e.g. as telescoping tripod for cameras or corresponding, demanding applications.

Since many modifications, variations and changes in detail may be made to the described embodiments, it is intended that all matter contained in the foregoing description or shown in the accompanying drawings be interpreted as illustrative and not in a limiting sense.

I claim:

1. A telescopically extendable and retractable arm comprising a supporting tube member of large diameter, a plurality of telescoping tube members of decreasing diameter each telescoping tube member having tube walls and an upper and a lower open end, and an innermost tube member of smallest diameter;

at least one belt means for each one of said tube members, with the exception of said supporting tube member, mounted slidingly surrounding said tube wall at said upper and lower ends and fixedly connected to a respective outer one and to a respective inner one of said tube members for supporting said inner one of said tube members; and driving means for dislocating one of said telescoping tube members relative to said supporting tube member, said dislocation being transmitted to all other telescoping tube members by said belt means.

2. The telescopically extendable and retractable arm of claim 1, wherein said supporting tube member and said telescoping tube members comprise profiled tube sections having a cross-sectional shape corresponding substantially to an integral polygon; wherein each of said telescoping tube members includes, at every second side of said polygon, one of said belt means; and wherein said telescoping tube members are arranged one into the other such that the belt means of respective adjoining telescoping tube members are located at staggered polygon sides.

3. The telescopically extendable and retractable arm of claim 2, wherein the belt means located at two adjacent polygon sides of the telescoping members form together a continuous kinematic train between said supporting tube and said innermost tube member.

4. The telescopically extendable and retractable arm of claim 3, wherein said arm comprises at least three of said kinematic trains.

5. The telescopically extendable and retractable arm of claim 1, which arm is structured as a linearly extendable and retractable telescopic tube, wherein linear guiding means are arranged between adjacent ones of said supporting and telescoping, respectively, tube members;

6. The telescopically extendable and retractable arm of claim 7, wherein said linear guiding means is located between the supporting tube member and the telescoping tube member having the largest diameter and the balance of the telescoping tube members remain unguided.

7. The telescopically extendable and retractable arm of claim 6 and structured as a load lifting column, including a load balancing means, at said supporting tube member and acting on the adjoining telescoping tube member having the largest diameter, for supporting at least a portion of a load acting on the telescoping arm.

8. The telescopically extendable and retractable arm of claim 7, wherein said load balancing means comprises a hydropneumatic system including at least one hydraulic cylinder located within the telescoping tube members and including a pressure reservoir.

9. The telescopically extendable and retractable arm of claim 8, comprising a plurality of hydraulic cylinders which are arranged to be selectively connected to or disconnected from, respectively, said pressure reservoir.

10. The telescopically extendable and retractable arm of claim 1, wherein said driving means comprises at least one linear drive arranged on said supporting tube member and acting on the telescoping tube member having the largest diameter.

11. The telescopically extendable and retractable arm of claim 10, wherein said linear drive comprises a spindle drive located within the retracted telescoping tube members.

12. The telescopically extendable and retractable arm of claim 10, wherein the telescoping tube member having the largest diameter and adjoining the supporting tube member extends under and within the other telescoping tube members at their bottom side and is mounted to said linear drive inside of the arm.

13. The telescopically extendable and retractable arm of claim 1, comprising a plurality of independently operable driving means, arranged at said supporting tube member and acting on the telescoping tube member having the largest diameter, for moving said largest diameter telescoping tube member in a defined angular position relative to said supporting member; and wherein the telescoping tube members are movable into angular positions relative to each other, such that by a angular positions relative to each other, such that by a suitable controlling of said driving means the telescopically extendable and retractable arm can be moved into a curvilinearly extending configuration.

14. The telescopically extendable and retractable arm of claim 1, wherein said belt means comprise steel belts.

15. The telescopically extendable and retractable arm of claim 14, wherein said steel belts are composed of a plurality of layers which are not mutually interconnected.

16. The telescopically extendable and retractable arm of claim 14, including means for prestressing said belt means by an adjustable prestressing force.

* * * * *